United States Patent
Feng et al.

(10) Patent No.: US 10,565,091 B2
(45) Date of Patent: *Feb. 18, 2020

(54) METHOD AND APPARATUS FOR AUTOMATIC CROSS-SYSTEM PROGRAM DEBUGGING

(71) Applicant: International Business Machines Corporation, Armonk, NY (US)

(72) Inventors: Yan Feng, Beijing (CN); Guo Qiang Li, Beijing (CN); Cheng Fang Wang, Beijing (CN); Xin Zheng, Beijing (CN); Xi Bo Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/034,800

(22) Filed: Jul. 13, 2018

(65) Prior Publication Data

US 2018/0322029 A1    Nov. 8, 2018

Related U.S. Application Data

(63) Continuation of application No. 14/825,655, filed on Aug. 13, 2015, now Pat. No. 10,055,331.

(30) Foreign Application Priority Data

Oct. 29, 2014    (CN) .......................... 2014 1 0593373

(51) Int. Cl.
*G06F 9/44* (2018.01)
*G06F 11/36* (2006.01)

(52) U.S. Cl.
CPC ...... *G06F 11/3624* (2013.01); *G06F 11/3636* (2013.01)

(58) Field of Classification Search
CPC .................................................. G06F 11/3624
See application file for complete search history.

(56) References Cited

U.S. PATENT DOCUMENTS 6,941,492 B1    9/2005    Ezra et al.
7,200,839 B2    4/2007    Kadlecik et al.
(Continued)

FOREIGN PATENT DOCUMENTS

| CN | 1959652 A | 5/2007 |
|----|-----------|--------|
| CN | 102279790 A | 12/2011 |
| CN | 103678135 A | 3/2014 |

OTHER PUBLICATIONS

IBM: List of IBM Patents or Patent Applications Treated as Related (Appendix P), Oct. 29, 2018, pp. 1-2.
(Continued)

*Primary Examiner* — Hang Pan
(74) *Attorney, Agent, or Firm* — Michael O'Keefe (57) ABSTRACT

The present invention discloses a method and apparatus for automatic cross-system program debugging. One embodiment of the present invention provides a method for cross-system program debugging. The method comprises: determining a first breakpoint in a first debugging session of a first system; determining a second breakpoint in a second debugging session of a second system, the second system being different from the first system; and responsive to a user performing a debugging action of associating the first breakpoint with the second breakpoint in the first debugging session and the second debugging session, recording an association between the first breakpoint and the second breakpoint for automating the program debugging across the first system and the second system. There is further described a corresponding apparatus.

15 Claims, 3 Drawing Sheets

(56) References Cited

U.S. PATENT DOCUMENTS

| | | |
|---|---|---|
| 8,024,706 B1 | 9/2011 | Krauss |
| 8,171,346 B2 | 5/2012 | Stairs et al. |
| 8,429,553 B2 | 4/2013 | Maybee et al. |
| 8,683,267 B2 | 3/2014 | Chandran et al. |
| 2005/0066314 A1 | 3/2005 | Bates et al. |
| 2005/0210335 A1 | 9/2005 | Muratori et al. |
| 2005/0223359 A1 | 10/2005 | Rao Nagaraju et al. |
| 2014/0245310 A1 | 8/2014 | Claes |
| 2016/0124838 A1 | 5/2016 | Feng et al. |

OTHER PUBLICATIONS

Feng et al., "Method and Apparatus for Automatic Cross-System Program Debugging," English Translation Application and Drawings, Filed on Oct. 29, 2014, p. 1-29, China Patent Application Serial No. 201410593373.4.

Hallinan, "Debugging Multiple Tasks," Embedded Linux Primer: A Practical, Real-World Approach, Sep. 18, 2006, p. 1-4, Section 15.4, Prentice Hall, http://www.embeddedlinux.org.cn/EmbeddedLinuxPrimer/0136130550/ch15lev1sec4.html, Accessed on Jul. 17, 2015.

Wikipedia, "Application Response Measurement," Wikipedia: the Free Encyclopedia, Last Modified on Mar. 19, 2014, p. 1-4, https://en.wikipedia.org/wiki/Application_Response_Measurement, Accessed on Jul. 17, 2015.

Manne et al., "Automating the Debugging of Large Numerical Codes", Modern Software Tools for Scientific Computing, Chapter 16, 1997 (best date available), pp. 339-352, Birkhauser, Boston, MA.

METHOD AND APPARATUS FOR AUTOMATIC CROSS-SYSTEM PROGRAM DEBUGGING

FIELD OF INVENTION

Embodiments of the present invention relate to the field of program development, and more specifically to a method and apparatus for automatic cross-system program debugging.

BACKGROUND

During a program development process, a programmer often needs to debug a compiled program to find grammatical and/or logical errors in the program source codes. A debugger is a common tool for executing debugging. For example, a dedicated debugger is always provided in an integrated development environment (IDE). For a debugging session in a single system, the debugging process is always completed using one or more breakpoints. As already known, the breakpoints are used for stopping a program in a debugging session at a location designated by the programmer so as to analyze the state of the program, a numerical value of a particular variable, etc.

However, in a multi-system environment, cross-system program debugging faces many challenges. In such an environment, tasks running on different systems always have a coordination or dependency relationship therebetween. Currently, automatic debugging cannot be realized in a cross-system environment. A user needs to initiate a plurality of debugging sessions on different systems, and control coordination and communication between different debugging sessions in a manual manner. During this process, the user needs to frequently switch between debugging sessions of different systems so as to locate a correct breakpoint. This process is time-consuming and error-prone. Moreover, after the user completes a round of debugging, it is hard to reproduce problems.

Additionally, for a to-be-debugged program supporting concurrent tasks, it is likely that a considerable number of tasks are simultaneously running on different systems in coordination. In a traditional solution, it is hard to accurately find correlated tasks under debugging in multiple tasks from different systems. For example, it is impossible to accurately determine execution of which relevant tasks on other systems is triggered by a debugged task on one system. Therefore, error like occurs to coordination between different debugging tasks, which causes failure of the whole debugging process.

SUMMARY

Generally, embodiments of the present invention provide a technical solution for automatic cross-system program debugging.

According to one aspect of the present invention, there is provided a method for automatic cross-system program debugging. The method comprises: determining a first breakpoint in a first debugging session of a first system; determining a second breakpoint in a second debugging session of a second system, the second system being different from the first system; and responsive to a user performing a debugging action of associating the first breakpoint with the second breakpoint in the first debugging session and the second debugging session, recording an association between the first breakpoint and the second breakpoint for automating the program debugging across the first system and the second system.

According to another aspect of the present invention, there is provided an apparatus for automatic cross-system program debugging. The apparatus comprises: a first determining unit configured to determine a first breakpoint in a first debugging session of a first system; a second determining unit configured to determine a second breakpoint in a second debugging session of a second system, the second system being different from the first system; and a recording unit configured to, responsive to a user performing a debugging action of associating the first breakpoint with the second breakpoint in the first debugging session and the second debugging session, record an association between the first breakpoint and the second breakpoint for automating the program debugging across the first system and the second system.

According to the embodiments of the present invention, cross-system manual debugging may be recorded based on breakpoints, so as to support subsequent automatic debugging and/or problem reproduction. Besides, compared with debugging information purely based on a single system, the recorded information about a user's cross-system debugging action may be used to implement a more accurate and efficient cross-system debugging function. Other features and advantages of the present invention will become more comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

In respective figures, same or like reference numerals are used to represent the same or like components.

DETAILED DESCRIPTION

Some preferable embodiments will be described in more detail with reference to the accompanying drawings, where the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

Figure 1:
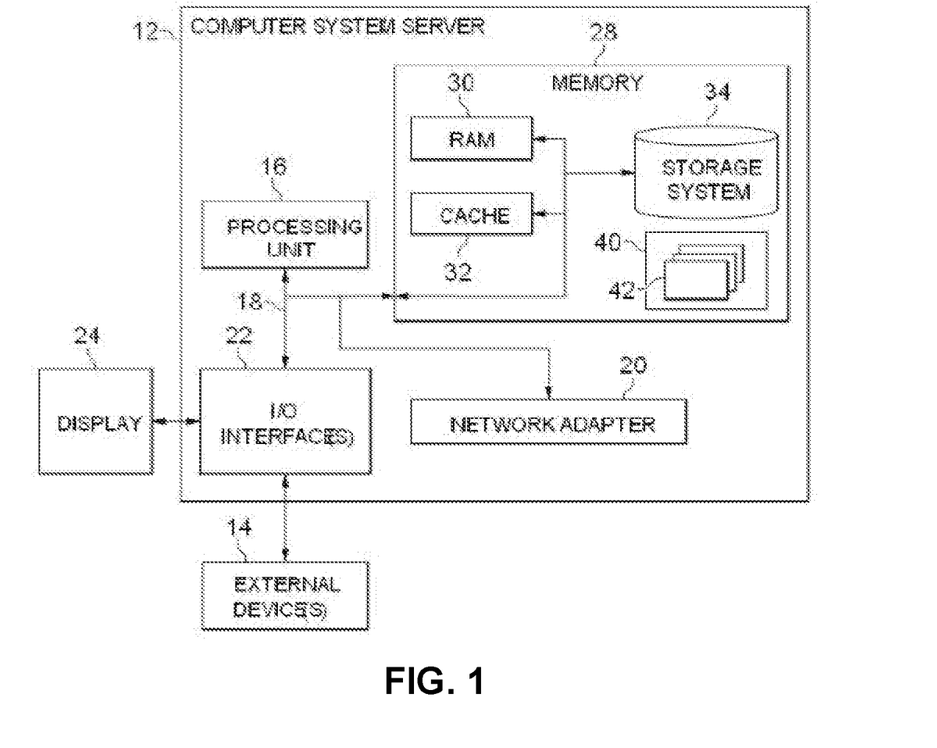
FIG. 1 shows an exemplary computer system/server which is applicable to implement embodiments of the present invention.

Referring now to FIG. 1, where an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Hereinafter, the mechanism and principle of embodiments of the present invention will be described in detail. Unless otherwise stated, the term "based on" used hereinafter and in the claims expresses "at least in part based on." The term "comprise" or "include" or a similar expression indicates an open inclusion, i.e., "including, but not limited to . . . " The term "plural" or a similar expression indicates "two or more." The term "one embodiment" indicates "at least one embodiment." The term "another embodiment" indicates "at least one another embodiment." Definitions of other terms will be provided in the description infra.

Figure 2:
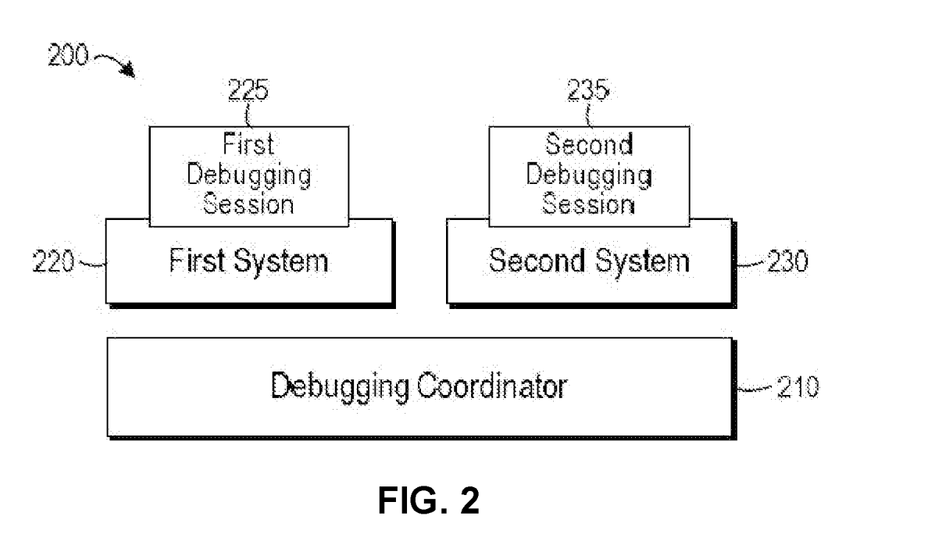
FIG. 2 shows a schematic block diagram of a cross-system debugging environment in which the embodiments of the present invention may be implemented.

FIG. 2 shows a schematic diagram of a debugging environment 200 in which embodiments of the present invention may be implemented. According to the embodiments of the present invention, there is provided an entity configured to coordinate program debugging between different systems, called "a debugging coordinator" 210. Generally, the debugging coordinator 210 may obtain debugging information (e.g., breakpoints) in respective debugging sessions involved in cross-system debugging, and record and store the user's cross-system debugging actions based on such debugging information.

The recorded information is subsequently available for automatic debugging or problem reproduction. Moreover, based on the recorded information, a cross-system state and higher-level debugging is enabled. Additionally, in one embodiment, a task as a debugging object may also be accurately determined among mass tasks from a plurality of systems.

At the ease of discussion, program debugging across two systems will be described. The two systems are called "a first system" 220 and "a second system" 230, respectively. However, it should be noted that, it is only exemplary, and not intended to limit the scope of the present invention in any manner. Embodiments of the present invention are applicable for debugging between any number of systems.

Note that in the context of the present disclosure, the term "system" may represent two separate machines or devices, or represent independent applications, program modules, etc. Correspondingly, the communication between the first system 220 and the second system 230 may be implemented through network connection such as a computer network, a telecommunications network, etc, or implemented through a monolithic communication mechanism such as function invoke, inter-process communication. besides, the cross-system program debugging likely involves a plurality of different physical devices or may be implemented on a single physical device.

Additionally, according to the embodiments of the present invention, the debugging coordinator 210 may be deployed on any one of the first system 220 and the second system 230. Alternatively, the debugging coordinator 210 may also be deployed independent of the first system 220 and the second system 230.

The debugging session executed on the first system is called "a first debugging session" 225, and the debugging session executed on the second system is called "a second debugging session" 235. The term "debugging session" used here refers to a session or process for debugging a program. For example, a user may initiate a debugger for a specific program code segment to thereby create a debugging session. A program in the debugging session may create a task and perform an operation like a normal program, till reaching a breakpoint or any other debugging flag, which will be described in detail.

In one embodiment, the debugging session may be run on a relevant system. Alternatively, in one embodiment, the debugging session may be completely or in part located remote to the relevant system, but can debug the program executed on the system. The scope of the present invention is not limited in this aspect.

Figure 3A:
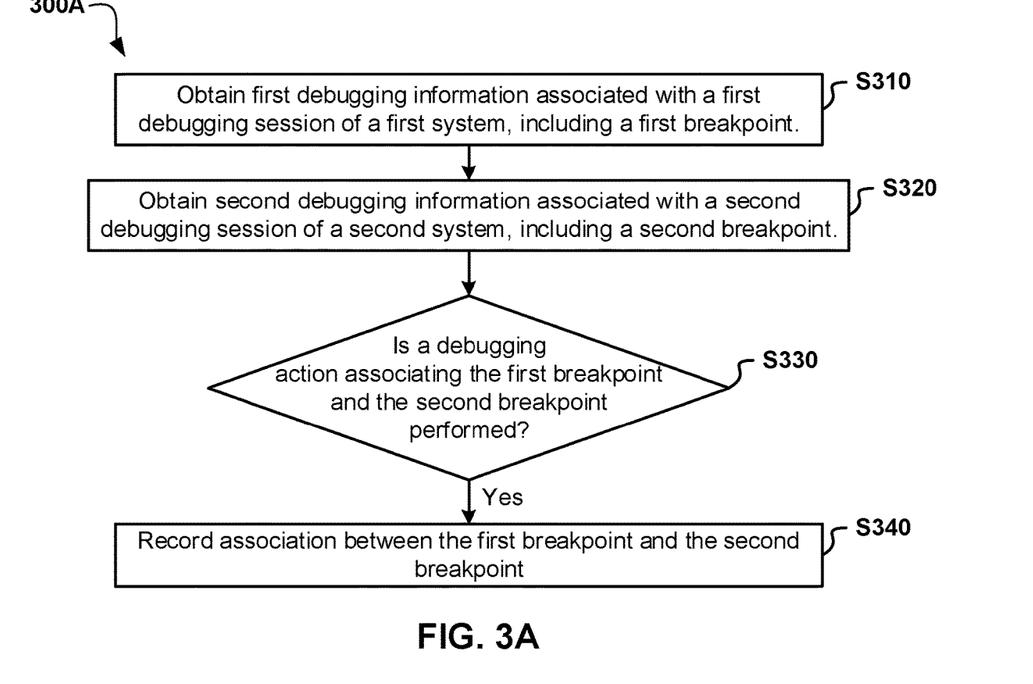
FIGS. 3A and 3B show a schematic flow diagram of a method for automatic cross-system program debugging according to the embodiments of the present invention.

FIG. 3A shows a flow diagram of a method 300A for cross-system program debugging according to the embodiments of the present invention. The method 300A may be executed by a debugging coordinator 210. As shown in the figure, the method 300A starts from step S310, where debugging information associated with a first debugging session of a first system is obtained, called "first debugging information."

According to the embodiments of the present invention, the first debugging information may indicate any information associated with a first debugging session. Particularly, in one embodiment, the first debugging information at least includes one or more breakpoints in program code set by the user during a first debugging session. For example, the first debugging information may indicate location of each breakpoint in the debugged program code in the first debugging session, for example, indicated by a row number. At the ease of discussion, suppose at least a first breakpoint in a first debugging session of a first system is determined at step S310.

Besides the information indicating a breakpoint, in one embodiment, the first debugging information may further indicate any other information associated with a first debugging session, e.g., the state of the debugged program code. Alternatively or additionally, the first debugging information may include relevant information in various other aspects such as the first system, the IDE used for executing the first debugging session.

Next, in step S320, debugging information associated with a second debugging session of the second system is obtained, called "second debugging information." Similar to the first debugging information, the second debugging information at least may indicate one or more breakpoints in the debugged program code set by the user in the second debugging session. The second debugging information may also include any other relevant information. At the ease of discussion, suppose a second breakpoint in the second debugging session of the second system is at least determined.

In particular, although step S320 is shown being executed after step S310 in FIG. 3A, it is only for the convenience of discussion, not intended to limit the scope of the present invention in any manner. It will be appreciated that the second debugging information may be obtained prior to the first debugging information or concurrently obtained with the first debugging information. In other words, steps S310 and S320 may be executed in any sequence, including concurrent execution.

Then, in step S330, it is determined whether the user has executed a debugging action associating the first breakpoint with the second breakpoint. As already known, when the debugged program in the debugging session is executed to the breakpoint, the user may execute the debugging action. The term "debugging action" used here refers to the action executed by the user for the debugging program after the debugged program is executed to the breakpoint.

In one embodiment, the debugging action may include maintaining the debugged program at a state of suspending execution. Therefore, the user, for example, may view the state of the debugged program and/or system. Alternatively or additionally, in one embodiment, the debugging action may include entering into the "single stepping" mode. In this mode, the user may debug the program line by line so as to find a problem existing in the program code. Other debugging actions are also feasible.

Contrary to the debugging action, if the user directly instructs the program to be continuously executed (i.e., skipping the breakpoint) after the debugged program reaches the breakpoint, it is believed that the user does not perform the debugging action at the breakpoint.

In the case that the user performs a debugging action at the first breakpoint in the first debugging session and also performs a debugging action at the second breakpoint in the second debugging session, it is believed that the user performs a debugging action associating the first breakpoint and the second breakpoint (branch "yes"). For example, in the case that the user maintains the first debugging session in a suspending and/or entering into a single stepping mode at the first breakpoint and maintains the second debugging session in a suspending and/or entering into a single stepping mode at the second breakpoint, it is believed that the user performs a debugging action associating the first breakpoint and the second breakpoint. It should be understood that the debugging actions in the first debugging session and the second debugging session may be identical or different. At this point, the method proceeds to step S340, in which association between the first breakpoint and the second breakpoint is recorded.

In one embodiment, tables may be used to record association between breakpoints in different debugging sessions. Such a table is called "debugging sequence table." In this embodiment, in step S340, entries associating the first breakpoint and the second breakpoint may be created in the table. Such entries are stored in the debugging sequence table according to the time sequence of debugging. As an example, Table 1 below shows an example of a debugging sequence table. Of course, the scope of the present invention is not limited to the table. On the contrary, any appropriate data structure may be used to store the cross-system association relationship between breakpoints.

TABLE 1

| Breakpoints in the first debugging session | Breakpoints in the second debugging session |
| --- | --- |
| A1 | B1 |
| A2 | B2 |
| A3 | B4 |
| . . . | . . . |

It should be understood that the association between breakpoints in different debugging sessions is not necessarily a one-to-one association. For example, a breakpoint in the first debugging session may be associated with more breakpoints in the second debugging session. Similarly, in one embodiment, one breakpoint in the second debugging session may be associated with more breakpoints in the first debugging session. The scope of the present invention is not limited in this aspect.

Figure 3B:
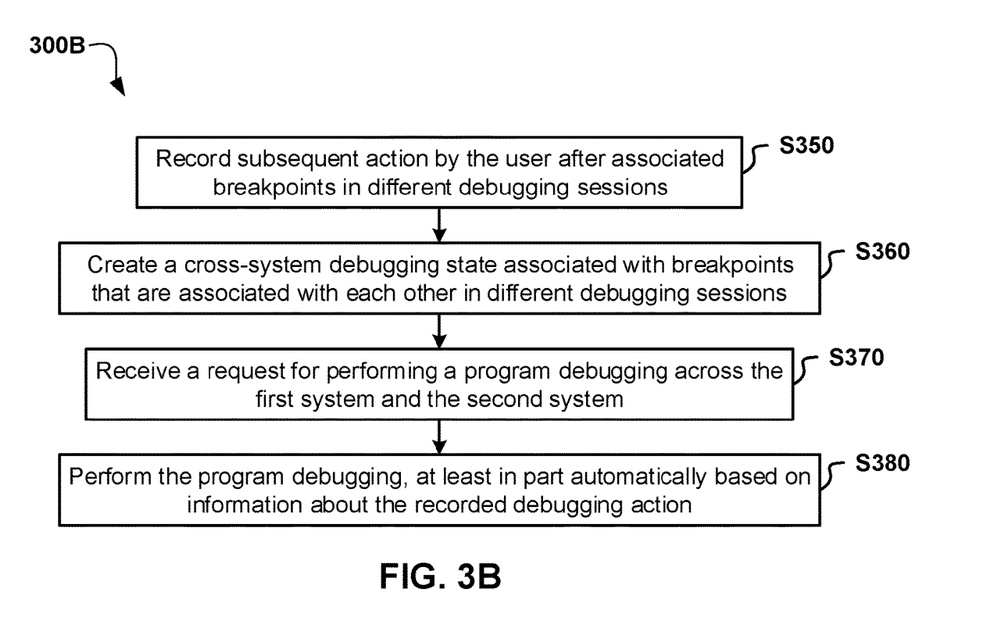

In some embodiments, besides steps S310 to S340 described above with reference to FIG. 3A, the cross-system program debugging according to the embodiments of the present invention may also comprise a plurality of optional operations or steps. As shown in FIG. 3B, in one embodiment, in step S350, an action performed by the user after associating a group of breakpoints is recorded. The step S350 may be executed after step S340 shown in FIG. 3A. Continue consideration of the above example, at the ease of discussion, it is further supposed that the first breakpoint arrives before the second breakpoint. In other words, the debugged program in the first debugging session is first executed to the first breakpoint; then the debugged program in the second debugging session is executed to the second breakpoint. At this time, in one embodiment, an action performed by the user after the debugging action associated with the second breakpoint may be monitored and recorded.

In particular, in one embodiment, it may be recorded whether the user selects continuing to perform the first debugging session or the second debugging session after returning from the second breakpoint. As discussed hereinafter, it is advantageous to problem reproduction and automatic debugging. Alternatively or additionally, other subsequent actions may also be recorded, e.g., the user's setting on relevant state on the first system and/or second system, operation on relevant data or file, etc.

As mentioned above, in one embodiment, the cross-system association between breakpoints and the action after returning from a breakpoint may be stored as an entry. These entries may be stored together to form a debugging sequence table according to the time sequence of debugging. As an example, Table 2 below shows a part of an exemplary debugging sequence table, including information related to a subsequent action performed by the user after the debugging action of associating breakpoints.

TABLE 2

| Breakpoint in the first debugging session | Breakpoint in the second debugging session | Subsequent action |
|---|---|---|
| A1 | B1 | Performing the first debugging session |
| A2 | B2, B3 | Performing the second debugging session |
| A3, A4 | B4 | Performing the first debugging session and the second debugging session |
| ... | ... | ... |

In the debugging sequence table shown in Table 2, each row records breakpoints having a cross-system association relationship. Moreover, optionally, the action performed by the user after each group of associated breakpoints. In this example, the recorded subsequent action is that the user selects which one of the first debugging session and the second debugging session to continue performing. For example, it may be seen from the first row of the debugging sequence table that the breakpoint A1 in the first debugging session and the breakpoint B1 in the second debugging session are associated. Moreover, after returning from the second breakpoint B1, the user continues to perform the first debugging session.

As mentioned above, the debugging sequence table is only a feasible implementation of recording breakpoint association, not intended to limit the scope of the present invention in any manner. In other embodiments, any appropriate data structure may be used to store the association relationships between breakpoints, including, but not limited to, textual file, extensible markup language (XML), tree, graph, etc.

Optionally, in one embodiment, for breakpoints associated in different debugging sessions, cross-system debugging states associated with these breakpoints may be recorded in step S360. It would be appreciated that in the cross-system program debugging, a breakpoint in a single debugging session does not surely reflect a meaningful overall debugging state. On the contrary, breakpoints associated in a plurality of debugging sessions can reflect such overall debugging state. Therefore, in one embodiment, a cross-system debugging state associated with a group of associated breakpoints associated with each other may be created and recorded. The term "cross-system debugging state" used here refers to an overall debugging state consisting of individual states associated with a plurality of debugging sessions (e.g., a first debugging session 225 and a second debugging session 235) involved in the debugging.

In one embodiment, the debugging state associated with a group of associated breakpoints may be designated by the user. For example, in one embodiment, responsive to cross-system association between a plurality of breakpoints in different debugging sessions being recorded, the user may be prompted to enter an overall debugging state relevant to these associated breakpoints. Alternatively or additionally, in one embodiment, the overall debugging state may be automatically inferred based on the current states of one or more systems involved in the debugging.

Only for the purpose of discussion, an embodiment of implementing the breakpoints as a debugging sequence table is still considered. As mentioned above, each row in the debugging sequence table records breakpoints that are associated with each other in different debugging sessions. Optionally, one or more rows may record the user's subsequent actions. In such an embodiment, for example, a dimension (column) called "debugging state" may be added to record the cross-system debugging state relevant to the associated breakpoints. As an example, the above Table 2 may be modified into the following Table 3:

TABLE 3

| Cross-system debugging state | Breakpoints in the first debugging session | Breakpoints in the second debugging session | Subsequent action |
|---|---|---|---|
| Ready to perform | A1 | B1 | Perform the first debugging session |
| Check the received request | A2 | B2, B3 | Perform the second debugging session |
| Check the data in the container | A3, A4 | B4 | Perform the first debugging session and the second debugging session |
| ... | ... | ... | ... |

It may be seen that for each group of associated breakpoints, the corresponding cross-system debugging state is set and recorded. For example, the cross-system debugging state related to the group of associated breakpoints {A2, B2, B3} is "check the received request." It would be appreciated that this state not only reflects the state of a debugged state in a debugging session, but also reflects the overall state of a plurality of coordinative systems.

In particular, in one embodiment, the user is allowed to set a breakpoint in such a cross-system debugging state. This breakpoint is different from a breakpoint for a specific program statement in a traditional program; instead, it is associated with the debugged overall state. Therefore, such breakpoint may be called "state breakpoint." For example, in the embodiment described above, a user may be allowed to set a breakpoint for the cross-system debugging state "checking the received request." In this manner, in the sequent debugging based on the recorded action information, execution of program in a plurality of debugging sessions may be coordinated to suspend the associated breakpoints, so as to debug for a specific state. An embodiment in this aspect will be described in detail below.

Through performing the above step, recording of the user's manual cross-system debugging process may be implemented. Based on the recorded information (for example, in the form of a debugging tracking table), automatic program debugging may be realized. For example, in one embodiment, when the user wishes to perform a cross-system debugging again to the previously debugged program, a request for the cross-system debugging may be issued. The coordinator may receive the request in step S370, and performs an automatic or semi-automatic cross-system debugging based on the recorded action information. In this way, automatic problem reproduction may be implemented, which is crucial to program debugging.

Moreover, according to the embodiments of the present invention, an automatic or semi-automatic cross-system debugging becomes possible. For example, in one embodiment, the debugging coordinator may control the automatic execution process of the cross-system program debugging based on the recorded association between the breakpoints in different debugging sessions and relevant user actions.

As an example, for Table 1, 2 or 3 as described above, when the program in the first debugging session on the first system is executed to breakpoint A1, the debugging coordinator may control the second system based on the generated debugging sequence table such that the program in the second debugging session is executed to the breakpoint B1, so as to check or verify the system state or the value of a variable or enter into a single stepping mode, and the like. Then, the debugging coordinator may continue to perform the first debugging session based on the recorded subsequent action. Next, responsive to the program in the first debugging session being executed to the breakpoint A2, the debugging coordinator may control the program in the second debugging session to be executed to the breakpoints B2, B2 in succession. When the program in the second debugging session reaches the breakpoint B3 and completes the corresponding debugging action, the debugging coordinator may control the program in the second debugging session on the second system to continue to be executed, and so on and so forth.

In particular, as mentioned above, in one embodiment, the user is allowed to set a state breakpoint for a cross-system debugging state. In one embodiment, the state breakpoint may be indicated in a cross-system debugging request. Alternatively or additionally, an indication of the state breakpoint may also be received from the user during the execution process of the cross-system debugging. The debugging coordinator may control the coordination between a plurality of debugging sessions on different systems based on one or more state breakpoints, such that execution of the whole application is suspended at a designated state breakpoint.

As an example, still consider the embodiments described above with reference to Table 2 or 3. Suppose the user sets a state breakpoint for the state "checking data in the container." At this point, the debugging coordinator will control the first system, such that the debugged program in the first debugging session is successively executed to the breakpoints A3 and A4. Moreover, the debugging coordinator may control the second system such that the debugged program in the second debugging session is executed to the breakpoint B4. In this case, the debugging coordinator may simultaneously stop continued execution of the program in the first and second debugging sessions. This is advantageous. For example, the user likely only cares about the system behavior under the overall state "checking data in the container." At this point, in the embodiments of the present invention, the user needn't perform manual interference with the debugging process to each of the breakpoints A3, A4, B4, which may significantly enhance the efficiency of the debugging process.

In the cross-system program debugging, another problem that needs to be solved is how to accurately find which tasks are associated among a plurality of tasks created by the being debugged program on different systems in the case of concurrency of multiple tasks. For example, suppose the first program being debugged in the first debugging session of the first system initiates the first task that will send a request to the second system. The second program being debugged in the second debugging session of the second system will generate a task of receiving the request. However, if the second system supports concurrent tasks, the second program, while being executed, may create a plurality of concurrent tasks for receiving the request.

Traditionally, in this case, it would be impossible to determine which task on the second system is associated with the first task on the first system. For example, in some known solutions, it is always supposed that the task first executed to the breakpoint set in the second program on the second system is associated with the first task on the first system. However, the practice shows that such supposition always does not stand and thus will cause failure of the debugging process.

Figure 4:
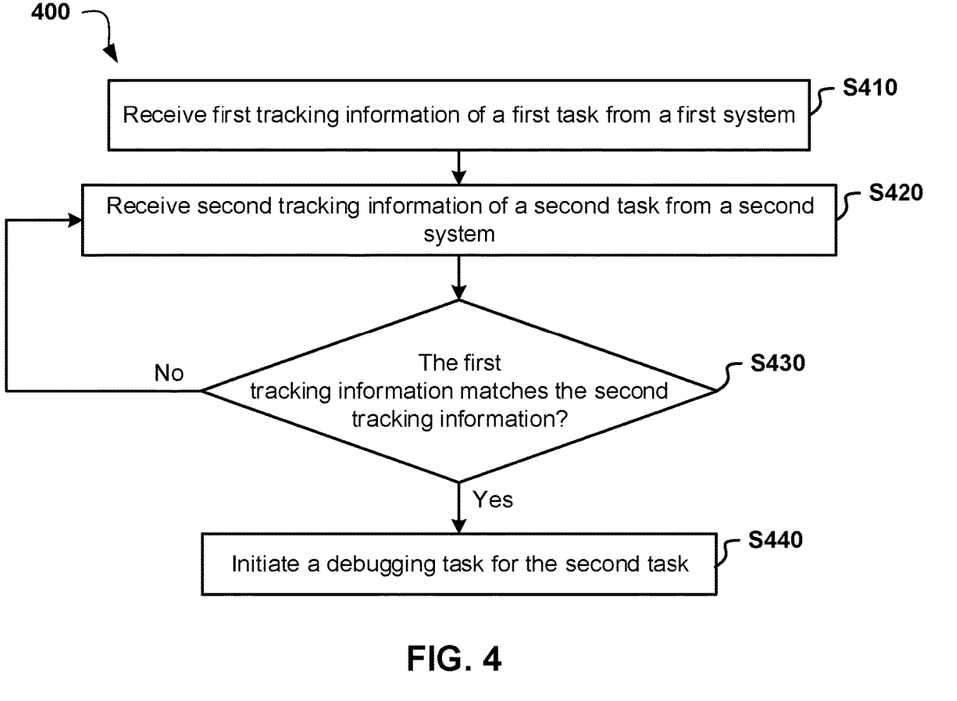
FIG. 4 shows a schematic flow diagram of a method for identifying associated tasks in different systems according to the embodiments of the present invention.

According to the embodiments of the present invention, there is provided a technical solution of identifying relevant tasks in debugging sessions of different systems. FIG. 4 shows a schematic flow diagram of an exemplary method 400 in this aspect. Similar to methods 300A and 300B, the method 400 may likewise be performed by a debugging coordinator. At the ease of discussion, the method 400 is still described with reference to the first debugging session on a first system and a second debugging session on a second system depicted above.

The method 400 starts from step S410. Here, tracking information of the first task is received from the first system. The first task is a task initiated by a debugged program in the first debugging session of the first system. Tracking information of a first tracking task may be any information specific to the first task, e.g., a unique identifier, number, alphabetical letter, or any combination thereof.

According to the embodiments of the present invention, when the first task is initiated, it will send specific first tracking information to a task interacting therewith on the second system. For example, the first task may send the first tracking information, along with data, to its associated task on the second task. Of course, it is also possible to send data and first tracking information, respectively. Moreover, the first task sends the first tracking information to a debugging coordinator.

The method 400 proceeds to step S420, in which tracking information (called "second tracking information") of one task (called "second task") is received from the second system. The second tracking information is specific tracking information about an associated task, received by the second task from the associated task on the first system. The second task may send the second tracking information to the debugging coordinator at any appropriate timing. For example, when the second task is created or initiated. Alternatively, the second tracking information may also be sent to the debugging coordinator when the second task first arrives at a breakpoint in the program.

In step S430, the debugging coordinator matches the first tracking information received from the first system in step S410 and the second tracking information received from the second system in step S420. If the first tracking information and the second tracking information do not match (branch "No"), it may be determined that the task on the first system associated with the second task is not the being debugged first task. In this case, the currently being processed second task will not trigger initiation of a debugging session. The method 400 returns to step S420 to continue to receive and detect tracking information sent by other tasks on the second system.

In the other aspect, if it is determined in step S430 that the first tracking information and the second tracking information match (branch "yes"), it may be determined that the task on the first system associated with the second task is the currently being debugged first task. Therefore, the second task is the task on the second system associated with the first task. In this case, the method 400 proceeds to step S440 to initiate a debugging task for the second task. For example, when execution of the second task arrives at a breakpoint, execution of the program will be suspended to check system state, variable values, etc.

It should be understood that methods 300 and 400 as described above may be used separately or in combination. For example, in a multi-system concurrent-task debugging, the method 400 may be first used to determine associated tasks on different systems, and then the method 300 may be used to record the user's action information and implement problem reproduction and/or automatic debugging based on the recorded action information. It would be appreciated that at this point, what is initiated in step S440 will be the second task processed in the method 300.

Figure 5:
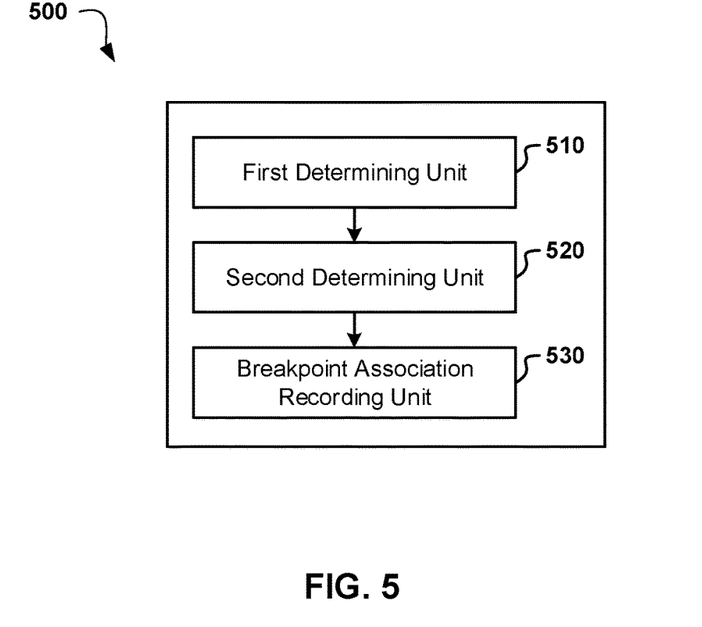
FIG. 5 shows a schematic block diagram of an apparatus for automatic cross-system program debugging according to the embodiments of the present invention.

FIG. 5 shows a schematic diagram of an apparatus 500 for program debugging according to the embodiments of the present invention. It would be appreciated that the apparatus 500 is an exemplary implementation of the debugging coordinator 210 shown in FIG. 2. As shown in the figure, the apparatus 500 comprises: a first determining unit (i.e. module) 510 configured to determine a first breakpoint in a first debugging session of a first system; a second determining unit 520 configured to determine a second breakpoint in a second debugging session of a second system, the second system being different from the first system; and a breakpoint association recording unit 530 configured to, responsive to a user performing a debugging action of associating the first breakpoint with the second breakpoint in the first debugging session and the second debugging session, record an association between the first breakpoint and the second breakpoint for automating the program debugging across the first system and the second system.

In one embodiment, the apparatus 500 may also comprise: a subsequent action recording unit configured to record an action performed by the user after debugging associated with the second breakpoint, the first breakpoint being prior to the second breakpoint. In one embodiment, the subsequent action recording unit may comprise: a subsequent debugging session recording unit configured to record whether the user continues execution of the first debugging session or the second debugging session after the debugging associated with the second breakpoint.

In one embodiment, the apparatus 500 may also comprise: a cross-system debugging state recording unit configured to record a cross-system debugging state associated with the first breakpoint and the second breakpoint, the cross-system debugging state indicating an overall state of the first debugging session and the second debugging session. In one embodiment, the apparatus 500 may also comprise: a state breakpoint setting unit configured to set a state breakpoint associated with the cross-system debugging state for controlling program debugging across the first system and the second system.

In one embodiment, the apparatus 500 may also comprise: a request receiving unit configured to receive a request for performing the program debugging across the first system and the second system; and a debugging performing unit configured to at least in part automatically perform the program debugging responsive to the request based on the recorded cross-system association between the breakpoints.

In one embodiment, the apparatus 500 may further comprise: a first tracking information receiving unit configured to receive first tracking information of a first task from a first system, the first tracking information being sent from the first system responsive to initiation of the first debugging session for the first task; a second tracking information receiving unit configured to receive second tracking information from a second task of a second system, the second tracking information being received from a task of the first system associated with the second task; and a debugging session initiating unit configured to initiate the second debugging session for the second task responsive to the first tracking information matching the second tracking information.

For the sake of clarity, FIG. 5 does not show optional units or sub-units included in the apparatus 500. All features and operations as described above are suitable for apparatus 500, respectively, which are therefore not detailed here. Moreover, partitioning of units or sub-units in apparatus 500 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the apparatus 500 may be implemented by various manners, including software, hardware, firmware or a random combination thereof. For example, in some embodiments, the apparatus may be implemented by software and/or firmware. Alternatively or additionally, the apparatus 500 may be implemented in part or completely based on hardware. for example, one or more units in the apparatus 500 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of automatic cross-system program debugging comprising:

determining a first breakpoint in a first debugging session of a first system;

determining a second breakpoint in a second debugging session of a second system, the second system being different from the first system; and responsive to a user performing a debugging action of associating the first breakpoint with the second breakpoint in the first debugging session and the second debugging session, recording an association between the first breakpoint and the second breakpoint for automating program debugging across the first system and the second system, wherein the association is recorded in a debugging sequence table stored in a data repository, and wherein the debugging sequence table records a plurality of associations between one or more breakpoints in a plurality of different debugging sessions, and wherein the debugging sequence table is selected from a group consisting of a textual file, an extensible markup language file, a tree, and a graph;

recording an action performed by the user after debugging associated with the second breakpoint in the debugging sequence table, the first breakpoint being prior to the second breakpoint; and performing the program debugging across the first system and the second system based on the recorded association.

2. The method according to claim 1, wherein the recording an action performed by the user after debugging associated with the second breakpoint comprises:

recording whether the user continues execution of the first debugging session or the second debugging session after the debugging associated with the second breakpoint in the debugging sequence table.

3. The method according to claim 1, further comprising:

recording a cross-system debugging state associated with the first breakpoint and the second breakpoint, the cross-system debugging state indicating an overall state of the first debugging session and the second debugging session.

4. The method according to claim 3, further comprising:

setting a state breakpoint associated with the cross-system debugging state for controlling program debugging across the first system and the second system.

5. The method according to claim 1, further comprising:

receiving first tracking information of a first task from a first system, the first tracking information being sent from the first system responsive to initiation of the first debugging session for the first task;

receiving second tracking information from a second task of the second system, the second tracking information being received from a task of the first system associated with the second task; and responsive to the first tracking information matching the second tracking information, initiating the second debugging session for the second task.

6. A computer system for automatic cross-system program debugging, comprising one or more processors, one or more computer-readable memories, one or more non-transitory computer-readable tangible storage medium, and program instructions stored on at least one of the one or more non-transitory tangible storage medium for execution by at least one of the one or more processors via at least one of the one or more memories, further comprising:

a first determining unit configured to determine a first breakpoint in a first debugging session of a first system;

a second determining unit configured to determine a second breakpoint in a second debugging session of a second system, the second system being different from the first system; and a breakpoint association recording unit configured to, responsive to a user performing a debugging action of associating the first breakpoint with the second breakpoint in the first debugging session and the second debugging session, record an association between the first breakpoint and the second breakpoint for automating the program debugging across the first system and the second system, wherein the association is recorded in a debugging sequence table stored in a data repository, and wherein the debugging sequence table records a plurality of associations between one or more breakpoints in a plurality of different debugging sessions, and wherein the debugging sequence table is selected from a group consisting of a textual file, an extensible markup language file, a tree, and a graph;

a subsequent action recording unit configured to record an action performed by the user after debugging associated with the second breakpoint in the debugging sequence table, the first breakpoint being prior to the second breakpoint; and a debugging performing unit configured to perform the program debugging across the first system and the second system based on the recorded association.

7. The computer system according to claim 6, wherein the subsequent action recording unit comprises:

a subsequent debugging session recording unit configured to record whether the user continues execution of the first debugging session or the second debugging session after the debugging associated with the second breakpoint in the debugging sequence table.

8. The computer system according to claim 6, further comprising:

a cross-system debugging state recording unit configured to record a cross-system debugging state associated with the first breakpoint and the second breakpoint, the cross-system debugging state indicating an overall state of the first debugging session and the second debugging session.

9. The computer system according to claim 8, further comprising:

a state breakpoint setting unit configured to set a state breakpoint associated with the cross-system debugging state for controlling program debugging across the first system and the second system.

10. The computer system according to claim 6, further comprising:

a first tracking information receiving unit configured to receive first tracking information of a first task from a first system, the first tracking information being sent from the first system responsive to initiation of the first debugging session for the first task;

a second tracking information receiving unit configured to receive second tracking information from a second task of a second system, the second tracking information being received from a task of the first system associated with the second task; and a debugging session initiating unit configured to initiate the second debugging session for the second task responsive to the first tracking information matching the second tracking information.

11. A computer program product for automatic cross-system program debugging, the computer program product comprising:

one or more computer-readable tangible storage medium and program instructions stored on at least one of the one or more tangible storage medium, the program instructions executable by a processor, the program instructions comprising:
program instructions to determine a first breakpoint in a first debugging session of a first system;
program instructions to determine a second breakpoint in a second debugging session of a second system, the second system being different from the first system; and
responsive to a user performing a debugging action of associating the first breakpoint with the second breakpoint in the first debugging session and the second debugging session, program instructions to record an association between the first breakpoint and the second breakpoint for automating program debugging across the first system and the second system, wherein the association is recorded in a debugging sequence table stored in a data repository, and wherein the debugging sequence table records a plurality of associations between one or more breakpoints in a plurality of different debugging sessions, and wherein the debugging sequence table is selected from a group consisting of a textual file, an extensible markup language file, a tree, and a graph;
program instructions to record an action performed by the user after debugging associated with the second breakpoint in the debugging sequence table, the first breakpoint being prior to the second breakpoint; and
program instructions to perform the program debugging across the first system and the second system based on the recorded association.

12. The computer program product according to claim 11, wherein the recording an action performed by the user after debugging associated with the second breakpoint comprises:
program instructions to record whether the user continues execution of the first debugging session or the second debugging session after the debugging associated with the second breakpoint in the debugging sequence table.

13. The computer program product according to claim 11, further comprising:
program instructions to record a cross-system debugging state associated with the first breakpoint and the second breakpoint, the cross-system debugging state indicating an overall state of the first debugging session and the second debugging session.

14. The computer program product according to claim 13, further comprising:
program instructions to set a state breakpoint associated with the cross-system debugging state for controlling program debugging across the first system and the second system.

15. The method according to claim 11, further comprising:
program instructions to receive first tracking information of a first task from a first system, the first tracking information being sent from the first system responsive to initiation of the first debugging session for the first task;
program instructions to receive second tracking information from a second task of the second system, the second tracking information being received from a task of the first system associated with the second task; and
responsive to the first tracking information matching the second tracking information, program instructions to initiate the second debugging session for the second task.

* * * * *